US007454445B2

(12) United States Patent
Lewis et al.

(10) Patent No.: US 7,454,445 B2
(45) Date of Patent: *Nov. 18, 2008

(54) WRITE ALLOCATION BASED ON STORAGE SYSTEM MAP AND SNAPSHOT

(75) Inventors: Blake Lewis, Palo Alto, CA (US); John Edwards, Sunnyvale, CA (US); Srinivasan Viswanathan, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 09/932,578

(22) Filed: Aug. 17, 2001

(65) Prior Publication Data
US 2002/0083037 A1 Jun. 27, 2002

Related U.S. Application Data

(63) Continuation-in-part of application No. 09/642,061, filed on Aug. 18, 2000, now Pat. No. 7,072,916.

(51) Int. Cl.
G06F 12/00 (2006.01)
G06F 7/00 (2006.01)
G06F 15/16 (2006.01)
(52) U.S. Cl. .................... 707/205; 707/10; 707/100; 711/112; 709/203
(58) Field of Classification Search ............. 707/1–10, 707/100–102, 104.1, 200–206; 711/100–101.4, 711/161–162, 111–112, 114, 170; 709/203, 709/218
See application file for complete search history.

(56) References Cited

U.S. PATENT DOCUMENTS 5,355,457 A * 10/1994 Shebanow et al. .......... 712/218
5,369,757 A * 11/1994 Spiro et al. .................. 714/19

(Continued)

FOREIGN PATENT DOCUMENTS

DE 694 25 658 T2 4/2001

(Continued)

OTHER PUBLICATIONS

Mulqueen, John T. "Product Analysis Review". Communications Week. v. 452, p. 25(1). May 3, 1993.

(Continued)

Primary Examiner—Miranda Le
(74) Attorney, Agent, or Firm—Blakely, Sokoloff, Taylor & Zafman LLP (57) ABSTRACT

The invention provides an improved method and apparatus for creating a snapshot of a file system. A "copy-on-write" mechanism is used. The snapshot uses the same blocks as the active file system until the active file system is modified. Whenever a modification occurs, the modified data is copied to a new block and the old data is saved. In this way, the snapshot only uses space where it differs from the active file system, and the amount of work required to create the snapshot is small. A record of which blocks are being used by the snapshot is included in the snapshot itself, allowing effectively instantaneous snapshot creation and deletion. A snapshot can also be deleted instantaneously simply by discarding its root inode.

14 Claims, 5 Drawing Sheets

U.S. PATENT DOCUMENTS

| | | | |
|---|---|---|---|
| 5,435,004 A * | 7/1995 | Cox et al. | 707/205 |
| 5,604,862 A | 2/1997 | Midgely et al. | |
| 5,649,152 A | 7/1997 | Ohran et al. | |
| 5,819,292 A | 10/1998 | Hitz et al. | |
| 5,835,953 A | 11/1998 | Ohran | |
| 5,956,745 A | 9/1999 | Bradford et al. | |
| 5,963,962 A | 10/1999 | Hitz et al. | |
| 5,987,477 A | 11/1999 | Schmuck et al. | |
| 6,038,570 A | 3/2000 | Hitz et al. | |
| 6,038,639 A * | 3/2000 | O'Brien et al. | 711/114 |
| 6,061,770 A | 5/2000 | Franklin | |
| 6,076,148 A * | 6/2000 | Kedem | 711/162 |
| 6,092,066 A * | 7/2000 | Ofek | 707/10 |
| 6,101,585 A | 8/2000 | Brown et al. | |
| 6,119,214 A * | 9/2000 | Dirks | 711/206 |
| 6,173,293 B1 | 1/2001 | Chandramohan et al. | |
| 6,175,900 B1 * | 1/2001 | Forin et al. | 711/156 |
| 6,202,136 B1 | 3/2001 | Wikle et al. | |
| 6,205,450 B1 | 3/2001 | Kanome | |
| 6,223,269 B1 * | 4/2001 | Blumenau | 711/202 |
| 6,272,502 B1 * | 8/2001 | Lieuwen et al. | 707/203 |
| 6,311,193 B1 * | 10/2001 | Sekido | 707/202 |
| 6,317,844 B1 | 11/2001 | Kleiman | |
| 6,374,268 B1 * | 4/2002 | Testardi | 707/205 |
| 6,418,449 B1 | 7/2002 | Chen et al. | |
| 6,434,681 B1 * | 8/2002 | Armangau | 711/162 |
| 6,446,183 B1 * | 9/2002 | Challenger et al. | 711/170 |
| 6,453,403 B1 * | 9/2002 | Czajkowski | 711/170 |
| 6,460,054 B1 | 10/2002 | Grummon | |
| 6,473,775 B1 * | 10/2002 | Kusters et al. | 707/200 |
| 6,484,186 B1 * | 11/2002 | Rungta | 707/203 |
| 6,529,995 B1 | 3/2003 | Shepherd | |
| 6,591,377 B1 * | 7/2003 | Evoy | 714/37 |
| 6,604,118 B2 * | 8/2003 | Kleiman et al. | 707/203 |
| 6,636,879 B1 * | 10/2003 | Doucette et al. | 707/205 |
| 6,665,815 B1 * | 12/2003 | Goldstein et al. | 714/20 |
| 6,674,447 B1 * | 1/2004 | Chiang et al. | 715/704 |
| 6,708,227 B1 * | 3/2004 | Cabrera et al. | 719/328 |
| 6,732,124 B1 * | 5/2004 | Koseki et al. | 707/202 |
| 6,748,504 B2 * | 6/2004 | Sawdon et al. | 711/162 |
| 6,836,780 B1 * | 12/2004 | Opitz et al. | 707/104.1 |

FOREIGN PATENT DOCUMENTS

| | | |
|---|---|---|
| EP | 0 702 815 B1 | 8/2000 |
| WO | WO 94/29807 A1 | 12/1994 |
| WO | WO 00/07104 A1 | 2/2000 |

OTHER PUBLICATIONS

SLASHDOT. TUX2: "The Filesystem That Would Be King", Oct. 17, 2000.

Hitz. "File System Design for an NFS File Server Appliance." USENIX Winter 1994, Jan. 19, 1994, pp. 1-23, Rev. C 3/95, USENIX Association, San Francisco, CA.

Hitz. "Technical Report TR01: An NFS File Server Appliance." 1993, pp. 1-9, Rev. A 8/93, Network Appliance Corporation, Santa Clara, CA.

* cited by examiner

WRITE ALLOCATION BASED ON STORAGE SYSTEM MAP AND SNAPSHOT

CROSS-REFERENCE TO RELATED APPLICATION

This application is a continuation-in-part of U.S. patent application Ser. No. 09/642,061, Express Mail Mailing No. EL 524 780 239 US, filed Aug. 18, 2000, in the name of the same inventors, titled "Instant Snapshot".

BACKGROUND OF THE INVENTION

1. Field of Invention

This invention relates to data storage systems.

2. Related Art

Snapshots of a file system capture the contents of the files and directories in a file system at a particular point in time. Such snapshots have several uses. They allow the users of the file system to recover earlier versions of a file following an unintended deletion or modification. The contents of the snapshot can be copied to another storage device or medium to provide a backup copy of the file system; a snapshot can also be copied to another file server and used as a replica. The WAFL (Write Anywhere File Layout) file system includes a copy-on-write snapshot mechanism. Snapshot block ownership in WAFL has been recorded by updating the block's entry in a blockmap file, which is a bitmap indicating which blocks are in-use and which are free for use.

One problem with the prior art of creating snapshots is that the requirement for additional file system metadata in the active file system to keep track of which blocks snapshots occupy. These methods are inefficient both in their use of storage space and in the time needed to create the snapshots.

A second problem with earlier snapshot implementations, was the time consuming steps of writing out a description of the snapshot state on creation and removing it on deletion.

A third problem with earlier copy-on-write mechanisms, was the required steps consumed a considerable amount of time and file system space. For example, some systems, such as those supplied with DCE/DFS, include a copy-on-write mechanism for creating snapshots (called "clones"). The copy-on-write mechanism was used to record which blocks each clone occupied. Such systems require a new copy of the inode file and the indirect blocks for all files and directories are created when updating all of the original inodes.

Accordingly, it would be advantageous to provide an improved technique for more quickly and efficiently capturing the contents of the files and directories in the file system at a particular point in time. This is achieved in an embodiment of the invention that is not subject to the drawbacks of the related art.

SUMMARY OF THE INVENTION

The invention provides an improved method and apparatus for creating a snapshot of a file system.

In a first aspect of the invention, the file system uses the fact that each snapshot includes a representation of the complete active file system as it was at the time the snapshot was made, including the blockmap of disk blocks indicating which ones are free and which ones are in use (herein called the "active map"). Because a record of which blocks are being used by the snapshot is included in the snapshot itself, the file system can create and delete snapshots very quickly. The file system uses those recorded blockmaps (herein called "snapmaps") as a source of information to determine which blocks cannot be reused because those blocks are being used by one or more snapshots.

In a second aspect of the invention, the file system uses that fact that it need only maintain a more limited blockmap of those disk blocks in use by the active file system, and a summary map of those disk blocks in use by one or more snapshots. The summary map can be computed from the snapmaps as the logical inclusive-OR of all the snapmaps. Because the file system need not maintain multiple bits of in-use/free data for each block, it uses the active map in conjunction with the summary map to determine whether blocks are in-use or free.

In a third aspect of the invention, the file system makes use of the fact that the summary map need not be updated every time a block is allocated or freed. Accordingly, the file system updates the summary map only (1) when a snapshot is deleted, and then only in a background operation, (2) on demand for areas for which write allocation is about to be performed, and (3) periodically in a background operation for selected portions of the summary map. These background operations are preferably performed concurrently with other file system operations.

Information is stored in a persistent storage medium accessible by the file system, to provide for resumption of operation following a reboot operation. For example, in a preferred embodiment, relevant information is stored in the file system "fsinfo block" for each snapshot, to indicate whether the summary file needs to be updated using that snapshot's snapmap information as a consequence of its creation or deletion. When a block is freed in the active file system, the corresponding block of the summary file is updated with the snapmap from the most recently created snapshot, if this has not already been done. An in-core bit map records the completed updates to avoid repeating them unnecessarily. This ensures that the combination of the active bitmap and the summary file will consistently identify all blocks that are currently in use. Additionally, the summary file is updated to reflect the effect of any recent snapshot deletions when freeing a block in the active file system. This allows reuse of blocks that are now entirely free. After updating the summary file following a snapshot creation or deletion, the corresponding bit in the fsinfo block is adjusted.

In a fourth aspect of the invention, the algorithm for deleting a snapshot involves examining the snapmaps of the deleted snapshot and the snapmaps of the next oldest and next youngest snapshot. A block that was used by the deleted snapshot but is not used by its neighbors can be marked free in the summary file, as no remaining snapshot is using it. However, these freed blocks cannot be reused immediately, as the snapmap of the deleted snapshot must be preserved until summary updating is complete. During a snapdelete free blocks are found by using the logical OR of the active bitmap, the summary file, and the snapmaps of all snapshots for which post-deletion updating is in progress. In other words, the snapmap of the deleted snapshot protects the snapshot from reuse until it is no longer needed for updating.

In the preferred embodiment, the invention is operative on WAFL file system. However, it is still possible for the invention to be applied to any computer data storage system such as a database system or a store and forward system such as cache or RAM if the data is kept for a limited period of time.

INCORPORATED DISCLOSURES

The inventions described herein can be used in conjunction with inventions described in the following applications:

- U.S. patent application Ser. No. 09/642,063, Express Mail Mailing No. EL524781089US, filed Aug. 18, 2000, in the name of Blake LEWIS, titled "Reserving File System Blocks," now U.S. Pat. No. 6,640,233.
- U.S. patent application Ser. No. 09/642,062, Express Mail Mailing No. EL524780242US, filed Aug. 18, 2000, in the name of Rajesh SUNDARAM, titled "Dynamic Data Storage," now U.S. Pat. No. 6,728,922.
- U.S. patent application Ser. No. 09/642,066, Express Mail Mailing No. EL524780256US, filed Aug. 18, 2000, in the name of Ray CHEN, titled "Manipulation of Zombie Files and Evil-Twin Files," now U.S. Pat. No. 6,751,635.
- U.S. patent application Ser. No. 09/642,064, in the names of Scott SCHOENTHAL, Express Mailing Number EL524781075US, titled "Persistent and Reliable Delivery of Event Messages", assigned to the same assignee, and all pending cases claiming the priority thereof.
- U.S. patent application Ser. No. 09/642,065, in the names of Douglas P. DOUCETTE et al., Express Mailing Number EL524781092US, titled "Improved Space Allocation in a Write Anywhere File System", assigned to the same assignee, now U.S. Pat. No. 6.636,879, and all pending cases claiming the priority thereof.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention might be implemented using a variety of other techniques without undue experimentation or further invention, and that such other techniques would be within the scope and spirit of the invention.

Lexicography

As used herein, use of the following terms refer or relate to aspects of the invention as described below. The general meaning of these terms is intended to be illustory and in no way limiting.

fsinfo (File System Information Block)—In general, the phrase "file system information block" refers to one or more copies of a block known as the "fsinfo block". These blocks are located at fixed locations on the disks. The fsinfo block includes data about the volume including the size of the volume, volume level options, language and more.

WAFL (Write Anywhere File Layout)—In general, the term "WAFL" refers to a high level structure for a file system. Pointers are used for locating data. All the data is included in files. These files can be written anywhere on the disk in chunks of file blocks placed in data storage blocks.

Consistency Point (CP)—In general, the term "CP" refers to a time that a file system reaches a consistent state. When this state is reached, all the files have been written to all the blocks and are safely on disk and the one or more copies of redundant fsinfo blocks get written out. If the system crashes before the fsinfo blocks go out, all other changes are lost and the system reverts back to the last CP. The file system advances atomically from one CP to the next.

Consistent State—In general, the phrase "consistent state" refers to the system configuration of files in blocks after the CP is reached.

Active file system—In general, the phrase "active file system" refers to the current file system arrived at with the most recent CP. In the preferred embodiment, the active file system includes the active map, the summary map and points to all snapshots and other data storage blocks through a hierarchy of inodes, indirect data storage blocks and more.

Active map—In general, the phrase "active map" refers to a to a file including a bitmap associated with the in-use or free status of blocks of the active file system.

Snapshot—In general, the term "snapshot" refers to a copy of the file system. The snapshot diverges from the active file system over time as the active file system is modified. A snapshot can be used to return the file system to a particular CP (consistency point).

Snapmap—In general, the term "snapmap" refers to a file including a bitmap associated with the vacancy of blocks of a snapshot. The active map diverges from a snapmap over time as the blocks used by the active file system change during consistency points.

Summary map—In general, the term "summary map" refers to a file including an IOR (inclusive OR) bitmap of all the snapmaps.

Space map—In general, the term "space map" refers to a file including an array of numbers which describe the number of storage blocks used in an allocation area.

Blockmap—In general, the term "blockmap" refers to a map describing the status of the blocks in the file system.

Snapdelete—In general, the term "snapdelete" refers to an operation that removes a particular snapshot from the file system. This command can allow a storage block to be freed for reallocation provided no other snapshot or the active file system uses the storage block.

Snapcreate—In general, the term "snapcreate" refers to the operation of retaining a consistency point and preserving it as a snapshot.

As described herein, the scope and spirit of the invention is not limited to any of the definitions or specific examples shown therein, but is intended to include the most general concepts embodied by these and other terms.

System Elements

Figure 1:
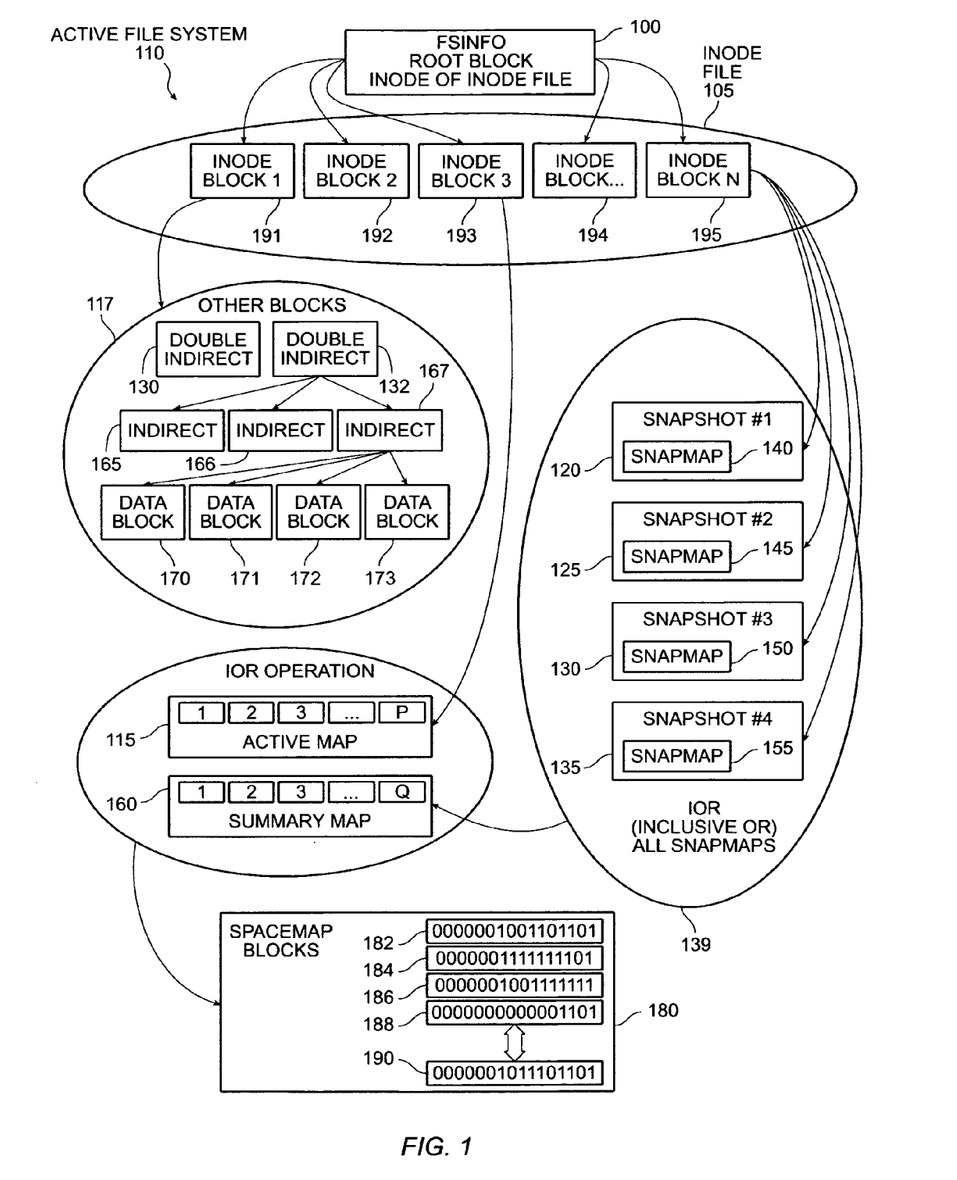
FIG. 1 shows a block diagram of a system for an instant snapshot.

FIG. 1 shows a block diagram of a system for an instant snapshot.

The root block 100 includes the inode of the inode file 105 plus other information regarding the active file system 110, the active map 115, previous active file systems known as snapshots 120, 125, 130 and 135 and their respective snapmaps 140, 145, 150 and 155.

The active map 115 of the active file system 110 is a bitmap associated with the vacancy of blocks for the active file system 110. The respective snapmaps 140, 145, 150 and 155 are active maps that can be associated with particular snapshots 120, 125, 130 and 135. A summary map 160 is an inclusive OR of the snapmaps 140, 145, 150 and 155. Also shown are other blocks 117 including double indirect blocks 130 and 132, indirect blocks 165, 166 and 167 and data blocks 170, 171, 172 and 173. Finally, FIG. 1 shows the spacemap 180 including a collection of spacemap blocks of numbers 182, 184, 186, 188 and 190. The root block 100 includes a collection of pointers that are written to the file system when the system has reached a new CP (consistency point). The pointers are aimed at a set of indirect (or triple indirect, or double indirect) inode blocks (not shown) or directly to the inode file 105 consisting of a set of blocks known as inode blocks 191, 192, 193, 194 and 195. The number of total blocks determines the number of indirect layers of blocks in the file system. The root block 100 includes a standard quantity of data, such as 128 bytes. 64 of these 128 bytes describe file size and other properties; the remaining 64 bytes are a collection of pointers to the inode blocks 191, 192, 193, 194 and 195 in the inode file 105. Each pointer in the preferred embodiment is made of 4 bytes. Thus, there are approximately 16 pointer entries in the root block 100 aimed at 16 corresponding inode blocks of the inode file 105 each including 4K bytes. If there are more than 16 inode blocks, indirect inode blocks are used.

In a preferred embodiment, file blocks are 4096 bytes and inodes are 128 bytes. It follows that each block of the mode file contains 32 (i.e. 4,096/128) separate modes that point to other blocks 117 in the active file system.

Inode block 193 in the inode file 105 points to a set of blocks (1, 2, 3, . . . , P) called the active map 115. Each block in the active map 115 is a bitmap where each bit corresponds to a block in the entire volume. A "1" in a particular position in the bitmap correlates with a particular allocated block in the active file system 110. Conversely, a "0" correlates to the particular block being unused by the active file system 110. Since each block in the active map 115 can describe up to 32K blocks or 128 MB, 8 blocks are required per GB, 8K blocks per TB.

Another inode block in the inode file 105 is inode block N 195. This block includes a set of pointers to a collection of snapshots 120, 125, 130 and 135 of the volume. Each snapshot includes all the information of a root block and is equivalent to an older root block from a previous active file system. The snapshot 120 may be created at any past CP. Regardless when the snapshot is created, the snapshot is an exact copy of the active file system at that time. The newest snapshot 120 includes a collection of pointers that are aimed directly or indirectly to the same inode file 105 as the root block 100 of the active file system 110.

As the active file system 110 changes (generally from writing files, deleting files, changing attributes of files, renaming file, modifying their contents and related activities), the active file system and snapshot will diverge over time. Given the slow rate of divergence of an active file system from a snapshot, any two snapshots will share many of the same blocks. The newest snapshot 120 is associated with snapmap 140. Snapmap 140 is a bit map that is initially identical to the active map 115. The older snapshots 125, 130 and 135 have a corresponding collection of snapmaps 145, 150 and 155. Like the active map 115, these snapmaps 145, 150 and 155 include a set of blocks including bitmaps that correspond to allocated and free blocks for the particular CP when the particular snapmaps 145, 150 and 155 were created. Any active file system may have a structure that includes pointers to one or more snapshots. Snapshots are identical to the active file system when they are created. It follows that snapshots contain pointers to older snapshots. There can be a large number of previous snapshots in any active file system or snapshot. In the event that there are no snapshot, there will be no pointers in the active file system. including bitmaps that correspond to allocated and free blocks for the particular CP when the particular snapmaps 145, 150 and 155 were created. Any active file system may have a structure that includes pointers to one or more snapshots. Snapshots are identical to the active file system when they are created. It follows that snapshots contain pointers to older snapshots. There can be a large number of previous snapshots in any active file system or snapshot. In the event that there are no snapshot, there will be no pointers in the active file system.

Blocks not used in the active file system 110 are not necessarily available for allocation or reallocation because the blocks may be used by snapshots. Blocks used by snapshots are freed by removing a snapshot using the snapdelete command. When a snapshot is deleted any block used only by that snapshot and not by other snapshots nor by the active file system becomes free for reuse by WAFL. If no other snapshot or active files uses the block, then the block can be freed, and then written over during the next copy-on-write operation by WAFL.

The system can relatively efficiently determine whether a block can be removed using the "nearest neighbor rule". If the previous and next snapshot do not allocate a particular block in their respective snapmaps, then the block can be freed for reuse by WAFL. For WAFL to find free space to write new data or metadata, it could search the active map 115 and the snapmaps (140, 145, 150 and 155) of the snapshots (120, 125, 130 and 135) to find blocks that are totally unused. This would be very inefficient; thus it is preferable to use the active map and the summary map as described below.

A summary map 160 is created by using an IOR (inclusive OR) operation 139 on the snapmaps 140, 145, 150 and 155. Like the active map 115 and the snapmaps 140, 145, 150 and 155, the summary map 160 is a file whose data blocks (1, 2, 3, . . . Q) contained a bit map. Each bit in each block of the summary map describes the allocation status of one block in the system with "1" being allocated and "0" being free. The summary map 160 describes the allocated and free blocks of the entire volume from all the snapshots 120, 125, 130 and 135 combined. The use of the summary file 160 is to avoid overwriting blocks in use by snapshots.

An IOR operation on sets of blocks (such as 1,024 blocks) of the active map 115 and the summary map 160 produces a spacemap 180. Unlike the active map 115 and the summary map 160, which are a set of blocks containing bitmaps, the spacemap 180 is a set of blocks including 182, 184, 186, 188 and 190 containing arrays of binary numbers. The binary numbers in the array represent the addition of all the vacant blocks in a region containing a fixed number of blocks, such as 1,024 blocks. The array of binary numbers in the single spacemap block 181 represents the allocation of all blocks for all snapshots and the active file system in one range of 1,024 blocks. Each of the binary numbers 182, 184, 186, 188 and 190 in the array are a fixed length. In a preferred embodiment, the binary numbers are 16 bit numbers, although only 10 bits are used.

In a preferred embodiment, the large spacemap array binary number 182 (0000001111111110=1,021 in decimal units) tells the file system that the corresponding range is relatively full. In such embodiments, the largest binary number 0000111111111 (1,023 in decimal) represents a range containing at most one empty. The small binary number 184 (0000000000001110=13 in decimal units) instructs the file system that the related range is relatively empty. The spacemap 180 is thus a representation in a very compact form of the allocation of all the blocks in the volume broken into 1,024 block sections. Each 16 bit number in the array of the spacemap 180 corresponds to the allocations of blocks in the range containing 1,024 blocks or about 4 MB. Each spacemap block 180 has about 2,000 binary numbers in the array and they describe the allocation status for 8 GB. Unlike the summary map 120, the spacemap block 180 needs to be determined whenever a file needs to be written.

Figure 2:
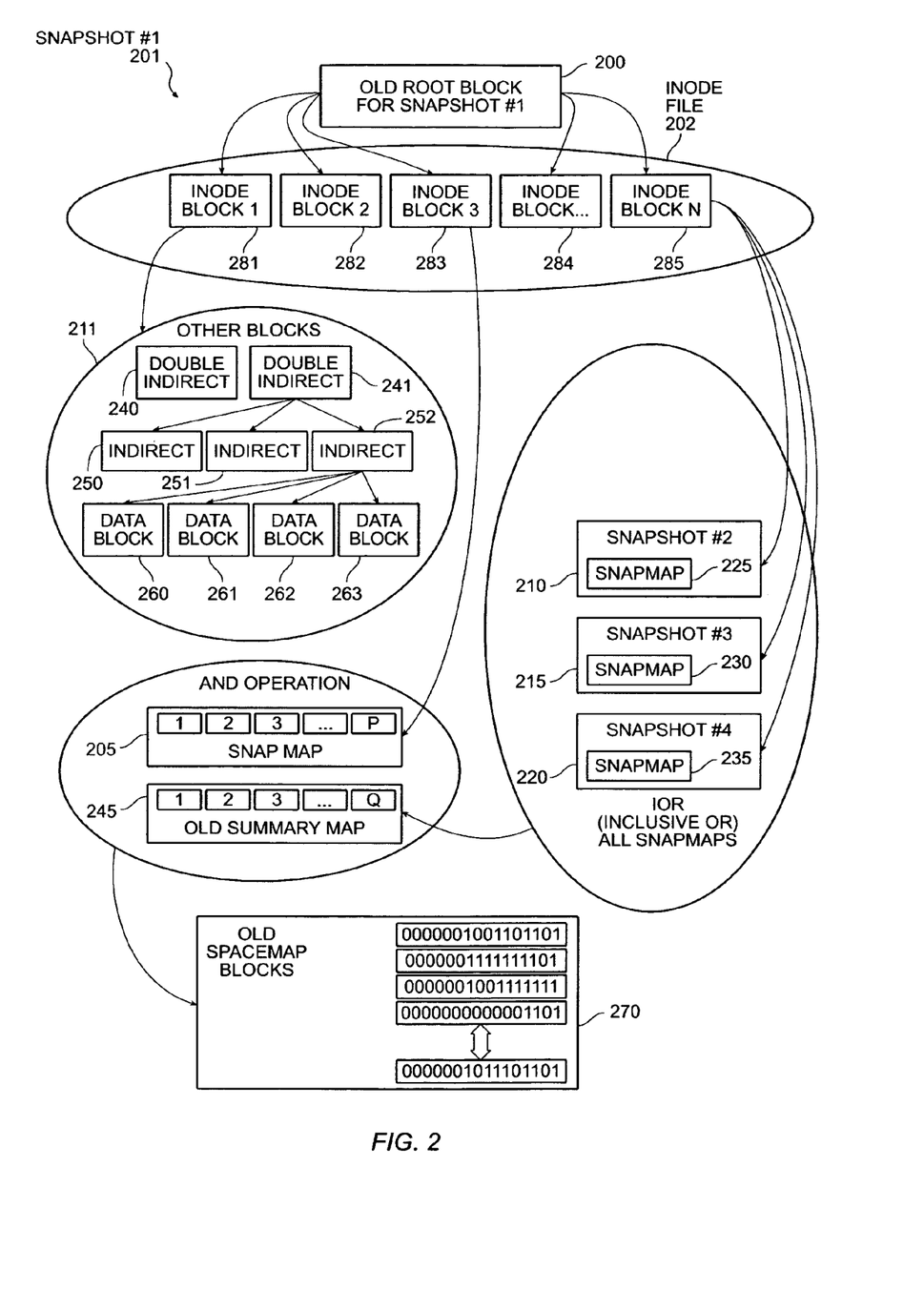
FIG. 2 shows a block diagram of an instant snapshot.

FIG. 2 shows a block diagram of an instant snapshot.

The old root block 200 of snapshot #1 201 includes the inode of the inode file 202 plus other information regarding the previous active file system known as snapshot #1 201, the snapmap 205, earlier active file systems known as snapshot #2 210, snapshot #3 215 and snapshot #4 220, and their respective snapmaps 225, 230 and 235.

The snapmap 205 of the previous active file system, snapshot #1 201, is a bitmap associated with the vacancy of blocks for snapshot #1 201. The respective snapmaps 225, 230 and 235 are earlier active maps that can be associated with particular snapshots 210, 215 and 220. A summary map 245 is an inclusive OR of the snapmaps 225, 230 and 235. Also shown are other blocks 211 including double indirect blocks 240 and 241, indirect blocks 250, 251 and 252, and data blocks 260, 261, 262, and 263. Finally, FIG. 2 shows the spacemap 270 of snapshot #1 201 including a collection of spacemap blocks of binary numbers.

The old root block 200 includes a collection of pointers that were written to the previous active file system when the system had reached the previous CP. The pointers are aimed at a set of indirect (or triple indirect, or double indirect) inode blocks (not shown) or directly to the inode file 202 consisting of a set of blocks known as inode blocks 281, 282, 283, 284 and 285.

An inode block 281 in the inode file 202 points to other blocks 211 in the old root block 200 starting with double indirect blocks 240 and 241 (there could also be triple indirect blocks). The double indirect blocks 240 and 241 include pointers to indirect blocks 250, 251 and 252. The indirect blocks 250, 251 and 252 include pointers that are directed to data leaf blocks 260, 261, 262, and 263 of the snapshot #1 201.

Inode block 283 in the inode file 202 points to a set of blocks (1, 2, 3, ... P) called the snap map 205. Each block in the snap map 205 is a bitmap where each bit corresponds to a block in the entire volume. A "1" in a particular position in the bitmap correlates with a particular allocated block in the snapshot #1 201. Conversely, a "0" correlates to the particular block being free for allocation in the old root block 200. Each block in the snap map 205 can describe up to 32K blocks or 128 MB.

Inode file 202 also includes inode block N 285. This block includes a set of pointers to a collection of earlier snapshots, snapshot #2 210, snapshot #3 215 and snapshot #4 220 of the volume. Each snapshot includes all the information of a root block and is equivalent to an older root block from a previous active file system.

Snapshot #1 201 also includes an old summary map 245 and old spacemap blocks 270. Although these blocks of data are included in snapshot #1 201 and previous snapshots, in a preferred embodiment, this data is not used by the active file system.

Method of Use

Figure 3:
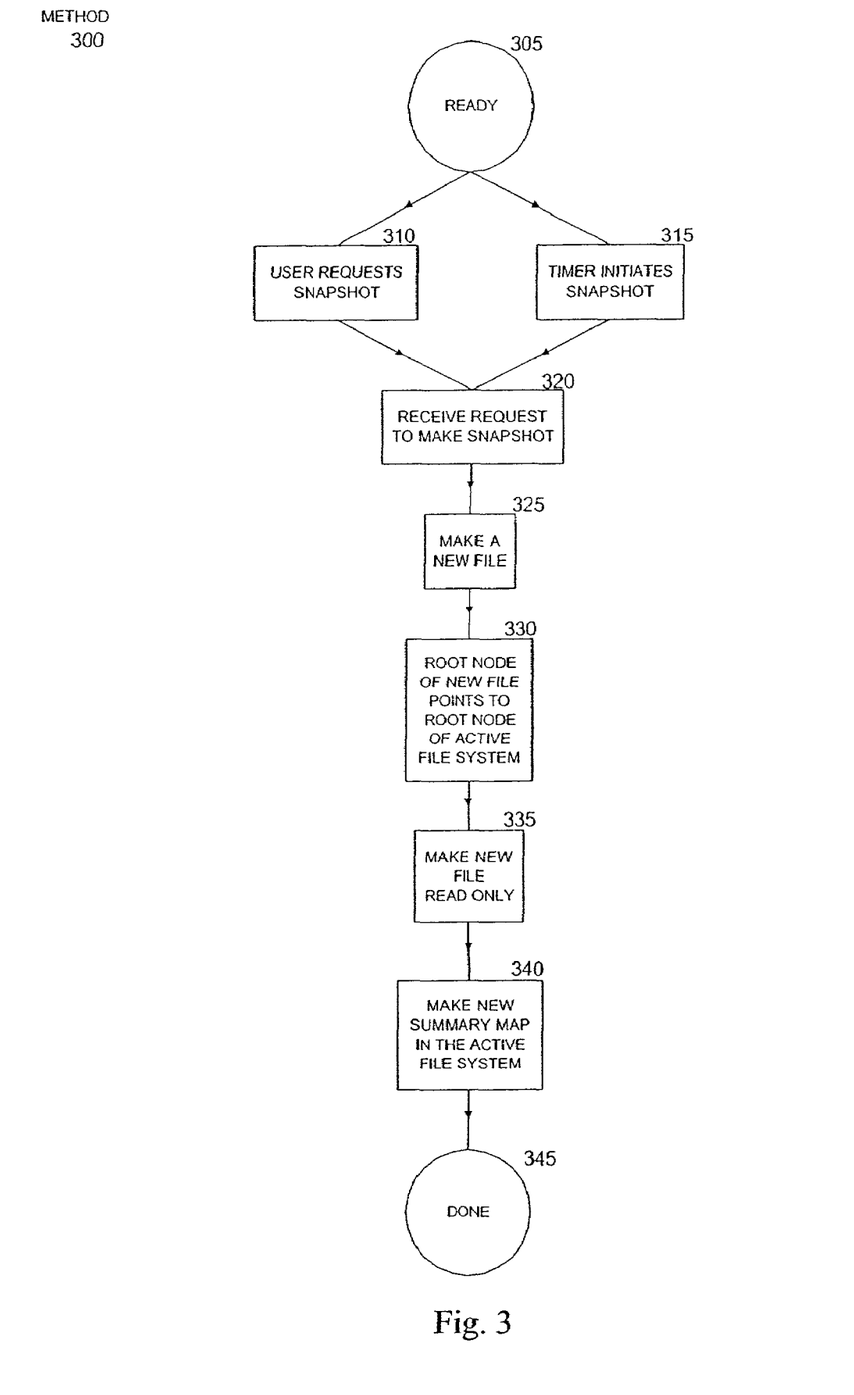
FIG. 3 shows a flow diagram of a method for creating a snapshot.

FIG. 3 shows a flow diagram of a method for using a system as shown in FIG. 1.

A method 300 is performed by the file system 110. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 305, the file system 110 is ready to perform a method 300.

At a step 310, a user will request a snapshot of the file system 110.

At a step 315, a timer associated with the file system 110 initiates the creation of a new snapshot.

At a step 320, the file system 110 receives a request to make a snapshot.

At a step 325, the file system 110 creates a new file.

At a step 330, the root node of the new file points to the root node of the current active file system.

At a step 335, the file system 110 makes the file read only.

At a step 340, the file system 110 updates the new summary map by using an inclusive OR of the most recent snapmap and the existing summary file. This step must be done before any blocks are freed in the corresponding active map block. If multiple snapshots are created such that the processing overlaps in time, the update in step 340 need only be done for the most recently created snapshot.

At a flow point 345, the snapshot create and the summary file update is completed and the snapshot creation is done.

An analogous method may be performed for snapshot delete.

Figure 4:
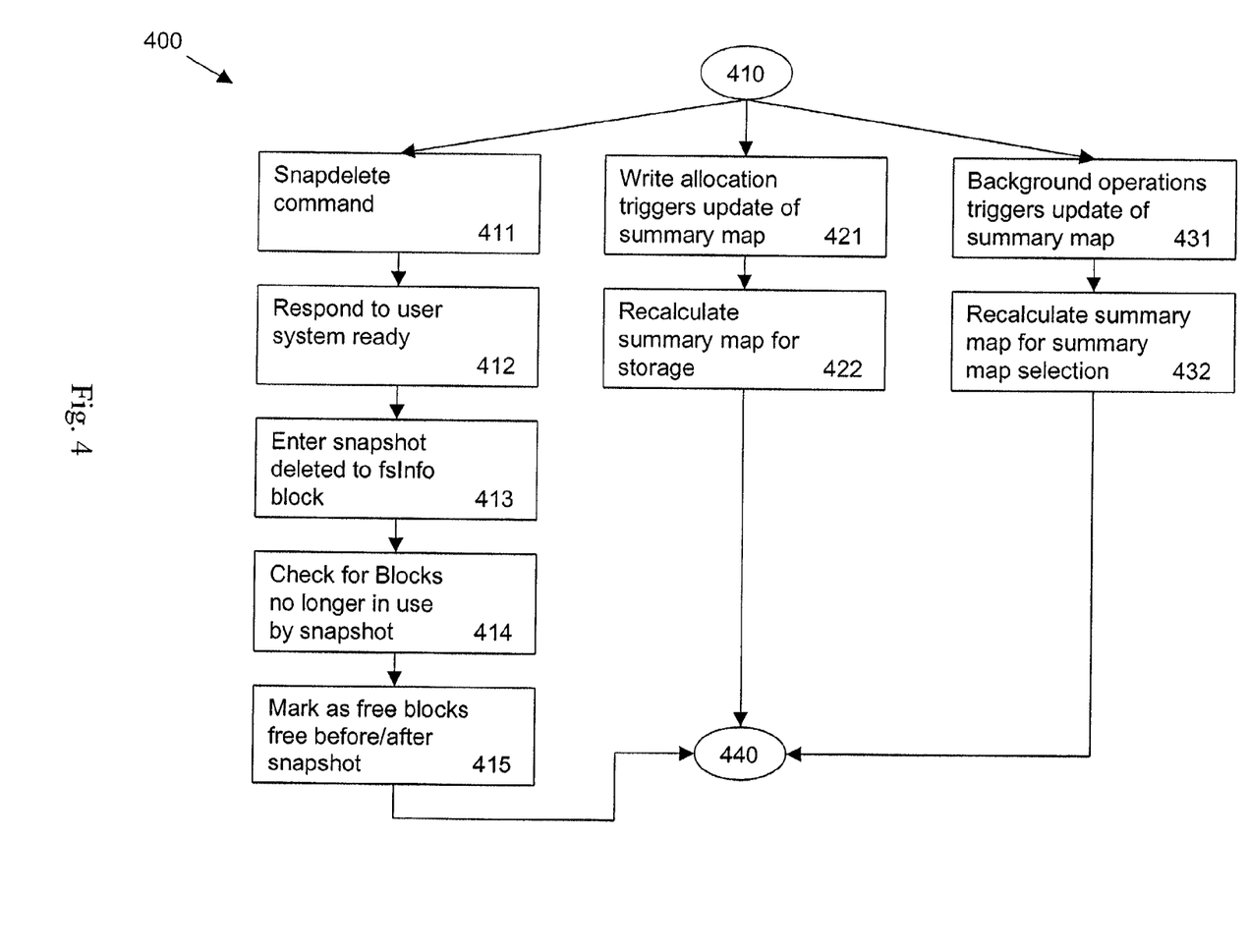
FIG. 4 shows a flow diagram of a method for updating a summary map.

FIG. 4 shows a flow diagram of a method for updating a summary map.

A method 400 is performed by the file system 110. Although the method 400 is described serially, the steps of the method 400 can be performed by separate elements in conjunction or in parallel, whether asynchronously, in a pipelined manner, or otherwise. There is no particular requirement that the method 400 be performed in the same order in which this description lists the steps, except where so indicated.

At a flow point 410, the file system 100 is ready to update the summary map.

At a step 411, update of the summary map is triggered by a "snapdelete" command from an operator or user. As part of this step, the file system 100 receives and recognizes the "snapdelete" command.

At a step 412, the file system 110 responds immediately to the operator or user, and is ready to receive another operator or user command. However, while the operator or user sees a substantially immediate response, the file system 110 continues with the method 400 to process the "snapdelete" command.

At a step 413, the file system 110 marks an entry in the fsinfo block to show that the selected snapshot (designated by the "snapdelete" command) has been deleted.

At a step 414, the file system 110 examines the snapmap for the selected snapshot for blocks that were in use by the selected snapshot, but might now be eligible to be freed.

At a step 415, the file system 110 examines the snapmaps for (A) a snapshot just prior to the selected snapshot, and (B) a snapshot just after the selected snapshot. For blocks that were in use by the selected snapshot, the file system 110 sets the associated bit to indicate the block is FREE, only if both of those snapmaps show that the block was free for those snapshots as well.

The method 400 continues with the flow point 440.

At a step 421, update of the summary map is triggered by a write allocation operation by the file system 110. In a preferred embodiment, a write allocation operation occurs for a selected section of the mass storage. The "write allocation" operation refers to selection of free blocks to be seized and written to, as part of flushing data from a set of memory buffers to mass storage. As part of this step, the file system 110 determines a portion of the summary map corresponding to the selected section of the mass storage.

At a step 422, the file system 110 recalculates the summary map for the portion of the summary map corresponding to the selected section of the mass storage.

The method 400 continues with the flow point 440.

At a step 431, update of the summary map is triggered by a background operation. In a preferred embodiment, the file system 110 updates about one 4K data block of the summary map.

At a step 432, the file system 110 recalculates the summary map for the portion of the summary map selected to be updated.

The method 400 continues with the flow point 440.

At a flow point 440, the file system 110 has updated at least a portion of the summary map, and is ready to be triggered for further updates later.

Figure 5:
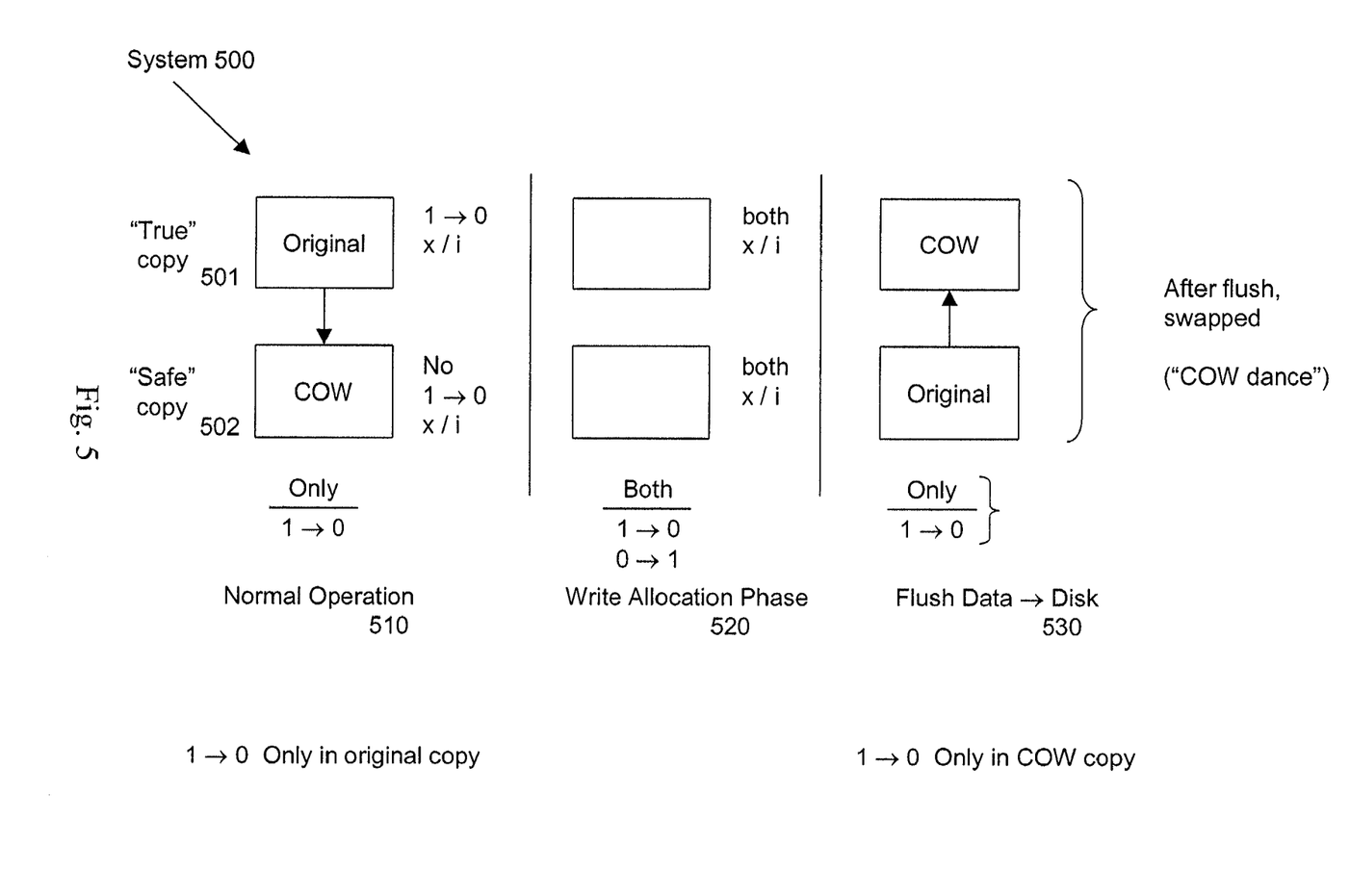
FIG. 5 shows a block diagram of copy-on-write maintenance of the active map.

FIG. 5 shows a block diagram of copy-on-write maintenance of the active map.

When blocks are freed in the active map, the file system 110 is careful to not reuse those blocks until after a consistency point has passed (and thus that the newly free status of the block has been recorded in a snapshot). Accordingly, the file system 110 maintains two copies of the active map, a "true" copy 501 and a "safe" copy 502.

In normal operation 510 (outside a time when a consistency point is being generated), the file system 110 maintains both the "true" copy 501 and the "safe" copy 502 of the active map. Since in normal operation 510 blocks can only be freed, not allocated, only changes from IN-USE to FREE are allowed. The file system 110 makes all such changes in the "true" copy 501, but does not make them to the "safe" copy 502. The "safe" copy 502 therefore indicates those blocks which can be safely allocated at the next consistency point.

While generating a consistency point, during a write allocation interval 520, blocks can be either freed (by continued operation of the file system 110) or allocated (by the write allocation operation). Both types of change are made to both the "true" copy 501 and the "safe" copy 502.

While still generating a consistency point, during a flush data to disk interval 530, blocks can again only be freed (by continued operation of the file system 110); they cannot be allocated because the write allocation interval 520 is finished for that consistency point. The file system 110 makes all such changes in the "safe" copy 502, but does not make them to the "true" copy 501. At the end of the flush data to disk interval 530, the file system 110 switches the roles of the "true" copy 501 and the "safe" copy 502, so that all such changes were in fact made to the new "true" copy 501 only.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A method comprising:
   maintaining an active map of information indicating in-use blocks and free blocks of an active file system in a storage system;
   maintaining a set of snapshots in the storage system, each snapshot representing a state of said active file system at a particular point in time, each snapshot having a corresponding active map indicating in-use blocks and free blocks of the active file system for a point in time at which said snapshot was generated;
   computing a summary map as a logical OR of the active maps of at least two of said snapshots, wherein said computing includes performing a bitwise logical operation on at least two copies of earlier active maps included in said set of snapshots;
   identifying a set of snapshots created since a recent update of a selected portion of the summary map;
   updating said selected portion of the summary map based on only a most recent one of said identified snapshots, and
   using the summary map to make write allocation decisions in the storage system based on both a current active map of the active file system and said summary map, including using the summary map to avoid overwriting blocks used by a snapshot.

2. A method as in claim 1, wherein said summary map is computed using an inclusive OR operation.

3. A method as in claim 1, wherein using the summary map to make write allocation decisions in the storage system comprises:
   computing a combination of a current active map and said summary map; and
   making write allocation decisions based on a result of said computing.

4. A method comprising:
   maintaining an active map of information indicating in-use blocks and free blocks of an active file system;
   maintaining a set of snapshots, each snapshot representing a state of said active file system at a particular point in time, each snapshot having a corresponding active map indicating in-use blocks and free blocks of the active file system for a point in time at which said snapshot was generated;
   maintaining a summary map computed as a logical OR on active maps included in at least two of said snapshots, wherein said maintaining includes performing a bitwise logical operation on at least two copies of earlier active maps included in said set of snapshots:
   identifying a set of snapshots created since a recent update of a selected portion of the summary map;
   updating said selected portion of the summary map based on only a most recent one of said identified snapshots,
   making a write allocation decision based on both a current active map of the active file system and the summary map, including using the summary map to avoid overwriting blocks used by a snapshot;
   receiving a request to delete a particular snapshot; and
   deleting said particular snapshot, wherein said deleting involves, for a block used by said particular snapshot, indicating said block is free in said summary map depending on a snapshot just prior to said particular snapshot and a snapshot just after said particular snapshot.

5. A method as in claim 4, wherein said indicating frees said block only when both said block is unused by said snapshot just prior to said particular snapshot; and said block is unused by said snapshot just after said particular snapshot.

6. A method as in claim 4, wherein said snapshot just after said particular snapshot corresponds to an active file system.

7. A method comprising:

maintaining an active map of information indicating in-use and free blocks associated with a file system;

maintaining a set of snapshots, each snapshot representing a state of said file system at a particular point in time;

maintaining a summary map computed as a logical OR of active maps included in at least two of said snapshots, wherein said maintaining includes performing a bitwise logical operation on at least two copies of earlier active maps included in said set of snapshots;

selecting a set of blocks maintained by said file system for which to perform a write allocation operation based on both a current active map of the file system and the summary map, including using the summary map to avoid overwriting blocks used by a snapshot;

identifying a set of snapshots created since a recent update of a selected portion of the summary map;

updating said selected portion of said summary map corresponding to said set of blocks, in response to said selecting; and performing said write allocation operation in response to said updated summary map.

8. A method as in claim 7, wherein said summary map is computed using an inclusive OR operation.

9. A method as in claim 7, wherein said logical union is an inclusive OR operation.

10. A method comprising:

maintaining a plurality of persistent point-in-time images of a file system, each persistent point-in-time image representing a state of said file system at a particular point in time, each persistent point-in-time image having associated therewith a separate map indicating in-use blocks and free blocks of the file system at the corresponding point in time;

generating a summary map as a logical OR on at least two of said maps associated with the plurality of said persistent point-in-time images, wherein said generating includes performing a bitwise logical operation on at least two copies of said earlier maps associated with the plurality of persistent point in time images;

identifying a set of snapshots created since a recent update of a selected portion of the summary map;

updating said selected portion of the summary map based on only a most recent one of said identified snapshots; and making write allocation decisions based on said summary map and a map indicating in-use blocks and free blocks associated with a current state of the file system, including using the summary map to avoid overwriting blocks used by a snapshot.

11. A method as in claim 10, wherein said summary map is computed using an inclusive OR operation.

12. A method comprising:

maintaining a plurality of snapshots of a structured set of data in a data storage system, each snapshot representing a state of said structured set of data at a particular point in time, each snapshot having associated therewith a separate active map indicating in-use blocks and free blocks of the structured set of data at the corresponding point in time;

generating a summary map which represents a summary of at least two of said active maps for different points in time, by using a logical OR of said at least two of said active maps, wherein said generating comprises performing a bitwise logical operation on at least two copies of said earlier maps included in said plurality of snapshot;

identifying a set of snapshots created since a recent update of a selected portion of the summary map;

updating said selected portion of the summary map based on only a most recent one of said identified snapshots; and making write allocation decisions relating to the structured set of data in the data storage system, based on the summary map and an active map indicating in-use blocks and free blocks associated with a current state of the structured set of data, including using the summary map to avoid overwriting blocks used by a snapshot.

13. A method as in claim 12, wherein the data storage system comprises a file server and the structured set of data is a file system.

14. A method as in claim 12, wherein the logical OR is an inclusive OR operation.

* * * * *